(12) United States Patent
Yoshida

(10) Patent No.: US 8,761,003 B2
(45) Date of Patent: Jun. 24, 2014

(54) DIGITAL TRANSMISSION METHOD AND DIGITAL TRANSMISSION SYSTEM

(75) Inventor: Yasuharu Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1479 days.

(21) Appl. No.: 10/445,963

(22) Filed: May 28, 2003

(65) Prior Publication Data

US 2004/0008623 A1    Jan. 15, 2004

(30) Foreign Application Priority Data

Jun. 5, 2002  (JP) ................................. 2002-163678

(51) Int. Cl.
*H04J 3/14* (2006.01)
(52) U.S. Cl.
USPC ............................ 370/225; 370/227; 375/259
(58) Field of Classification Search
USPC ............ 370/216–228, 204, 32, 286; 375/219; 455/560
See application file for complete search history.

(56) References Cited

U.S. PATENT DOCUMENTS

| | | | | |
|---|---|---|---|---|
| 4,471,491 A | * | 9/1984 | Abe et al. ...................... | 455/2.01 |
| 5,214,637 A | * | 5/1993 | Sridhar et al. ................ | 370/286 |
| 5,216,697 A | * | 6/1993 | Ohnuki ......................... | 375/347 |
| 5,495,472 A | | 2/1996 | Ohara | |
| 5,963,873 A | * | 10/1999 | Suzuki ......................... | 455/560 |
| 6,393,064 B1 | * | 5/2002 | Nagai et al. ................... | 375/259 |
| 6,788,737 B1 | * | 9/2004 | Miyoshi et al. ............... | 375/219 |
| 6,795,394 B1 | * | 9/2004 | Swinkels et al. ............. | 370/222 |
| 7,082,101 B2 | * | 7/2006 | Kim et al. ..................... | 370/225 |
| 7,173,930 B2 | * | 2/2007 | Wellbaum et al. ........... | 370/356 |
| 2004/0008623 A1 | * | 1/2004 | Yoshida ........................ | 370/225 |
| 2004/0190445 A1 | * | 9/2004 | Dziong et al. ................ | 370/225 |
| 2004/0208574 A1 | * | 10/2004 | Kinoshita et al. ............. | 398/83 |

FOREIGN PATENT DOCUMENTS

| | | |
|---|---|---|
| EP | 0157412 A2 | 10/1985 |
| JP | 62-194796 A | 8/1987 |
| JP | 03-262371 A | 11/1991 |
| JP | 03-293844 A | 12/1991 |
| JP | 04-266233 A | 9/1992 |
| JP | 05167619 A | 2/1993 |
| JP | 05-090995 A | 4/1993 |
| JP | 05-167619 A | 7/1993 |
| JP | 7-7458 A | 1/1995 |
| JP | 9-23216 A | 1/1997 |
| JP | 09-064883 A | 3/1997 |
| JP | 10-285081 A | 10/1998 |
| JP | 11-168410 A | 6/1999 |
| JP | 2001-7747 A | 1/2001 |
| WO | WO 99/35868 A1 | 7/1999 |
| WO | WO 01/08440 A1 | 2/2001 |

* cited by examiner

*Primary Examiner* — Andrew Lai
*Assistant Examiner* — Leon Andrews
(74) *Attorney, Agent, or Firm* — Sughrue Mion, PLLC

(57) ABSTRACT

A transmission capacity of a transmitter is controlled by a signal input from a receiver through a propagation path. The receiver produces a control signal for controlling a system at the optimum transmission capacity which is obtained from monitored information such as transmission quality or reception C/N and the like, and outputs the control signal to the transmitter and a judging circuit. The judging circuit compares the transmission capacity of each line. When the transmission capacity of a first regular line is the lowest transmission capacity, a switching signal is output from the judging circuit. Then a transmission switching device and a reception switching device operate and the input signal on the first regular line is output through the spare line. The transmission capacity of the signal is that of the spare line.

27 Claims, 5 Drawing Sheets

DIGITAL TRANSMISSION METHOD AND DIGITAL TRANSMISSION SYSTEM

BACKGROUND OF THE INVENTION

1. Field of the Invention

The present invention relates to a digital transmission system and a digital transmission method used therein and in particular, to a transmission system having a regular line and a spare line and using a capacity variable transmission system.

2. Description of the Related Art

Conventionally, a microwave digital transmission system has a spare line to prevent a line failure caused by the fluctuation of a propagation path. When a failure occurs in a regular line, a transmission is switched to the spare line so as to continue transmitting.

Besides, the digital transmission system used for a regular line and a spare line transmits data at a fixed, guaranteed transmission capacity. The guaranteed transmission capacity is so designed that the quality is guaranteed even in the extremely bad conditions which may cumulatively occur at a rate of about a few percent a year in the whole system including propagation paths and interference.

Accordingly, during the time excluding the time of bad conditions, that is, almost every usual time, the system is not fully utilized even though it has a potential to transmit a capacity exceeding the guaranteed transmission capacity.

FIG. 5 shows an example of the structure of the conventional microwave digital transmission system. In FIG. 5, a station A-c 5 is composed of transmission switching devices 54 and 55, transmitters 51 to 53, and a signal generator 56. A Station B-c 6 is composed of reception switching devices 64 and 65, a judging circuit 66, receivers 61 to 63, and a termination device 67. This microwave digital transmission system has two regular lines and one spare line.

Input signals on a first regular line Reg1 are input into the transmitter 52 via the transmission switching device 54. The input signals are digitally modulated in the transmitter 52. The input signals modulated in the transmitter 52 propagate through a propagation path 102 and are received at the receiver 62. The signals received at the receiver 62 are digitally demodulated in the receiver 62 and the original signals are output. The original signals demodulated in the receiver 62 are output via the reception switching device 64. The same process of the above is performed for signals input onto a second regular line Reg2, using the transmission switching device 54, a propagation path 103, the receiver 63, and the reception switching device 65.

The capacity transmitted via the regular lines and the spare line is the fixed, guaranteed transmission capacity. When the signal quality of the guaranteed transmission capacity transmitted via the regular line deteriorates, or a failure occurs in a regular line, the signals on the regular line are switched onto the spare line so that the quality is ensured.

The receivers 61 to 63 output signals showing the quality deterioration to the judging circuit 66 when the quality deterioration of the monitored transmitting signals exceeds the predetermined threshold value. The judging circuit 66, when received the signals from the receivers 61 to 63, outputs switching signals (including switching signals d3 and d4) for controlling the transmission switching devices 54 and 55 and the reception switching devices 64 and 65.

For example, when the spare line (especially the propagation path 101) is in the normal state (the signal is not output from the receiver 61) while a failure occurs in the first regular line Reg1, that is, the signal is output from the receiver 62, the judging circuit 66 outputs a switching signal d3 in addition to the switching signals. Once the transmission switching device 54 and the reception switching device 64 receive the switching signals from the judging circuit 66 and perform line switching, the input signals on the first regular line Reg1 are switched onto the spare line (101). As a result, the quality of the signals, which are to be transmitted via the first regular line Reg1, is prevented from deteriorating.

As described above, the conventional transmission system is a system which transmits a fixed, guaranteed transmission capacity via a regular line. A spare line in the system is used to transmit input signals on the regular line when the transmission quality of the guaranteed transmission capacity of the regular line deteriorates.

Accordingly, the regular line is not capable of transmitting a capacity exceeding the guaranteed transmission capacity even when the propagation conditions of the transmission system are in the good state. Further, since the spare line is used only when a failure occurs, the frequency of use is low. Therefore, the system is not efficient as a transmission system for transmitting a large amount of information.

SUMMARY OF THE INVENTION

It is therefore an object of the present invention to provide a digital transmission system and a digital transmission method used therein, which are capable of increasing the transmissions capacity and utilizing the spare line efficiently.

To achieve the aforementioned object, a digital transmission method of the present invention comprises the steps of; monitoring operational information of a regular line and a spare line operated with a capacity variable transmission system which varies the transmission capacity; when switching signals are output in the monitoring step, switching the transmission line of input signals on the regular line to the spare line according to the switching signals; and transmitting the input signals, which should be transmitted via the regular line, by switching the transmission line from the regular line to the spare line, and outputting the transmitted signals as the output signals of the regular line.

When a line transmitting the lowest transmission capacity is one of the regular lines in the step of monitoring the operational information, the input signals on the regular line are transmitted by switching onto the spare line and the transmitted signals are output as the output signals of the regular line.

In contrast, when a line transmitting the lowest transmission capacity is the spare line in the step of monitoring the operational information, switching of the transmission line is not performed.

A digital transmission device for performing the above-described digital transmission method of the present invention comprises; a regular line and a spare line operated with a capacity variable transmission system which varies a transmission capacity; a monitoring means for monitoring operational information of each of the regular line and the spare line; a switching means for switching the transmission line of input signals on the regular line to the spare line according to the monitored information output from the monitoring means; and a means for transmitting the input signals, which should be transmitted via the regular line, by switching the transmission line from the regular line to the spare line, and outputting the transmitted signals as the output signals of the regular line.

Another digital transmission method of the present invention comprises the steps of; monitoring operational information of a regular line and a spare line operated with a capacity variable transmission system which varies the transmission capacity; distributing input signals on the regular line to the spare line according to the operational information monitored; and by using the regular line and the spare line together, transmitting the input signals at a transmission capacity which is the sum of the transmission capacity of the regular line and the transmission capacity distributed to the spare line, and outputting the transmitted signals as the output signals of the regular line.

A digital transmission device for performing the above-mentioned digital transmission method of the present invention comprises; a regular line and a spare line operated with a capacity variable transmission system which varies a transmission capacity; a monitoring means for monitoring operational information of the regular line and the spare line; a distributing means for distributing input signals on the regular line to the spare line according to the monitored information output from the monitoring means; and by using the regular line and the spare line together, a means for transmitting the input signals at a transmission capacity which is the sum of the transmission capacity of the regular line and the transmission capacity distributed to the spare line, and outputting the transmitted signals as the output signal of the regular line.

With the structure described above, the regular line and the spare line constitute a capacity variable transmission system, which automatically varies the transmission capacity according to the state of the whole system including propagation paths and other components. Accordingly, during the time excluding the time of extremely bad conditions which may cumulatively occur at a rate of about a few percent a year in the whole system including propagation paths, interference and the like, that is, during almost every usual time, the system is capable of transmitting signals at a capacity exceeding the guaranteed transmission capacity.

This enables the digital transmission system of the present invention to transmit signals via a regular line at a capacity exceeding the guaranteed transmission capacity, and also, by allocating the transmission capacity of the spare line to the regular line, to add the capacity to the output of the regular line.

DESCRIPTION OF THE PREFERRED EMBODIMENTS

The preferred embodiments of the present invention will be described below with reference to the accompanying figures.

First Embodiment

Figure 1:
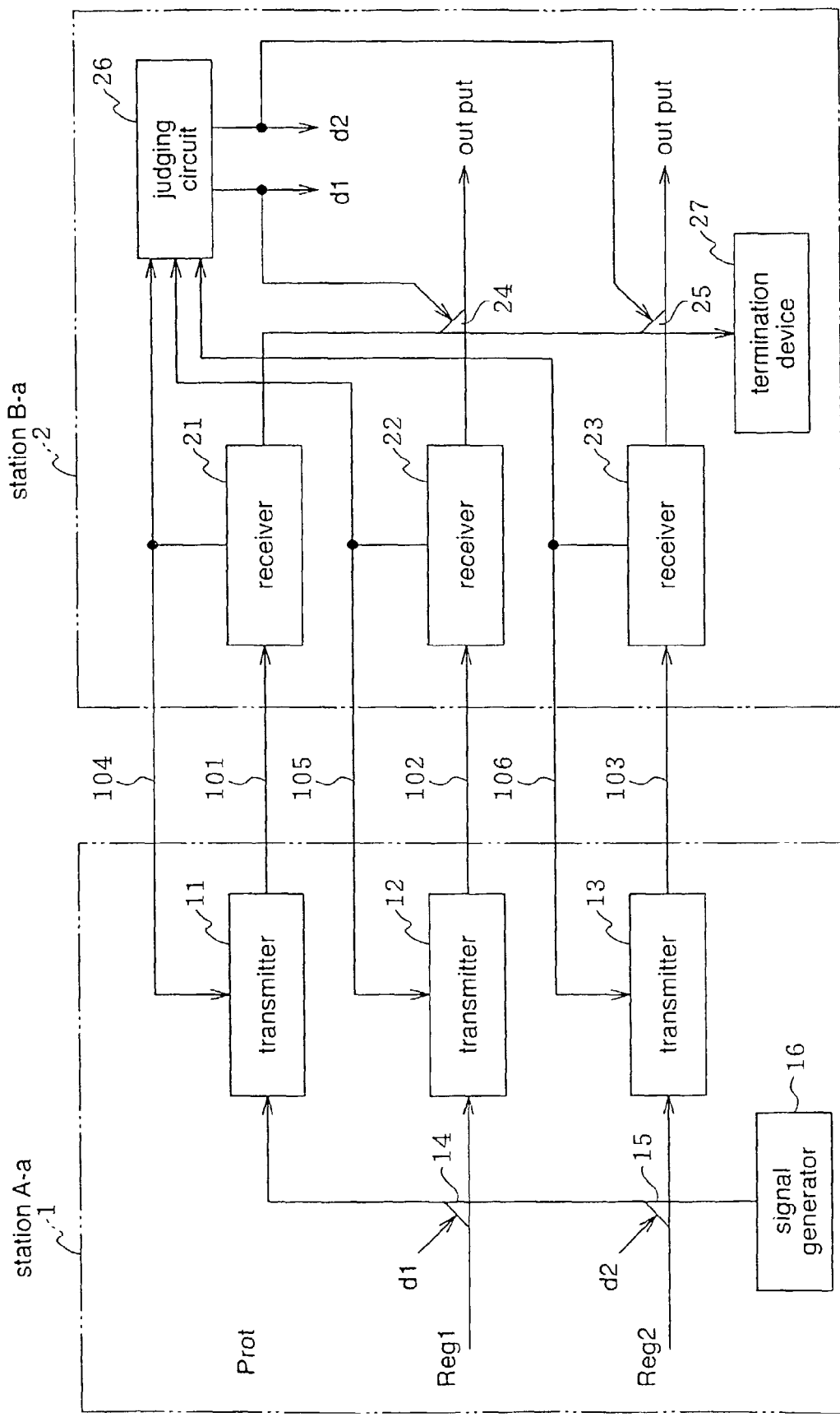
FIG. 1 is a block diagram showing the structure of a digital transmission system according to a first embodiment of the present invention.

FIG. 1 is a block diagram showing the structure of a digital transmission system according to a first embodiment of the present invention. In FIG. 1, the digital transmission system according to the first embodiment of the present invention has a station A-a 1 and a station B-a 2, and between the station A-a 1 and the station B-a 2, two regular lines and one spare line are arranged.

Specifically, the station A-a 1 comprises transmitters 11 to 13, transmission switching devices 14 and 15, and a signal generator 16. The station B-a 2 comprises transmitters 21 to 23, reception switching devices 24 and 25, a judging circuit 26 and a termination device 27. Further, between the station A-a 1 and the station B-a 2, propagation paths 101 to 103 and propagation paths 104 to 106 are arranged. Here, relays, which are not shown, for covering the attenuation of signals are arranged on the way of the propagation paths 101 to 103.

Transmission between the station A-a 1 and the station B-a 2 is performed through a space as a medium. Space paths are shown as the propagation paths 101 to 103 and the propagation paths 104 to 106. The propagation paths 104 to 106 have sending devices and receiving devices, which are not shown, on either end.

The signal generator 16 is a device generating pseudo signals equivalent to the input signals on the regular line. The pseudo signals are input onto the spare line so as to operate the spare line as same as the regular line. Input signals input onto the regular lines Reg1 and Reg2 are flow-controlled signals so as to be able to correspond to the changes in the transmission capacity of the lines. In order to switch the transmission onto the spare line when a failure occurs in the regular line, the signal generator 16 monitors the spare line through sending the pseudo signals onto it to thereby confirms that the spare line is in the normal state.

The receivers 21 to 23, the judging circuit 26 and the like constitute a means for monitoring the operational information of each of the regular lines and the spare line. The propagation paths 104 to 106, the transmitters 11 to 13 and the like constitute a means for switching the input signals on the regular line onto the spare line according to the monitored information of the regular line output from the monitoring means. The transmitters 11 to 13, the propagation paths 101 to 103 and the receivers 21 to 23 constitute a means for transmitting the input signals, which should be transmitted via the regular line, by switching the transmission line from the regular line to the spare line and outputting the transmitted signals as the output signals of the regular line.

For the regular lines and the spare line of the present embodiment (propagation paths 101 to 103), a capacity variable transmission system is used. The capacity variable transmission system means a transmission system which adaptively varies the transmission capacity within the transmission band of the propagation paths 101 to 103. The examples will be described below.

As examples of the capacity variable transmission, there are a method which changes a modulation and a method which changes a clock frequency. In the case of changing the modulation, by changing from 2PSK (Phase Shift Keying) to 256QAM (Quadrature Amplitude Modulation), the transmission capacity of the regular line and the spare line can be changed in the range from one to eight times. In the case of changing the clock frequency, the transmission capacity is changed in proportion to the changes in the clock frequency. It should be noted that the used frequency bandwidth in this case is also changed in proportion to the clock frequency. Therefore, the clock frequency must be changed within the allocated transmission band.

As another example of the capacity variable transmission, it is possible to use OFDM (Orthogonal Frequency Division Multiplexing), which is one of the multi-carrier systems. In this case, the transmission capacity of the regular line can be changed in accordance with the bit numbers (for example, 1 to 15 bits) assigned to each sub carrier (each bin) using OFDM.

The transmitters 11 to 13 are devices adaptive to the modulation method, the clock frequency changing method or OFDM in the capacity variable transmission described above. The transmission capacity of the transmitters 11 to 13 is controlled by signals from the receivers 21 to 23 input through the propagation paths 104 to 106.

The receivers 21 to 23 produce controlling signals for controlling the transmission capacity of the transmission system to the optimum transmission capacity obtained from the monitored information such as transmission quality, reception C/N (Carrier to Noise ratio) and the like, and then output the controlling signals to the transmitters 11 to 13 and the judging circuit 26.

The propagation paths 104 to 106 have sending devices which send signals received from the judging circuit 26 to the propagation paths 104 to 106, and receiving devices which receive the signals transmitted through the propagation paths 104 to 106 and output the signals to the transmitters 11 to 13, although these devices are not shown in the diagram.

With the structure described above, the regular lines and the spare line constitute the capacity variable transmission system, which automatically varies the transmission capacity according to the operational state of the whole system including the propagation paths and other components. Accordingly, during the time excluding the time of extremely bad conditions which may cumulatively occur at a rate of about a few percent a year in the whole system including the propagation paths and other components, that is, during almost every usual time, the system is capable of transmitting signals at a capacity exceeding the guaranteed transmission capacity.

Next, the operation of the spare line will be described.

When one of the receivers 21 to 23 outputs the controlling signal for controlling the respective transmission capacity of the regular lines and the spare line, the controlling signal is input into the judging circuit 26. The judging circuit 26, upon receipt of the controlling signal, compares the transmission capacity of each regular line with that of the spare line according to the controlling signal.

When the transmission capacity of a regular line is the lowest comparing with that of the other lines, the signals on the regular line are switched and input onto the spare line, and through the spare line, output as the signals of the regular line. It should be noted that the aforementioned switching is not performed when the transmission capacity of the spare line is the lowest comparing with that of the other lines.

Now, assuming that the transmission capacity of a first regular line is the lowest comparing with that of the other lines, the judging circuit 26 outputs a switching signal d1. The transmission switching device 14 and the reception switching device 24, upon receipt of the switching signal d1, operate in accordance with the switching signal d1. When the transmission switching device 14 and the reception switching device 24 start operate, the input signals on the first regular line are switched onto the spare line, and output through the spare line. The transmission capacity of the signals is that of the spare line.

Figure 2:
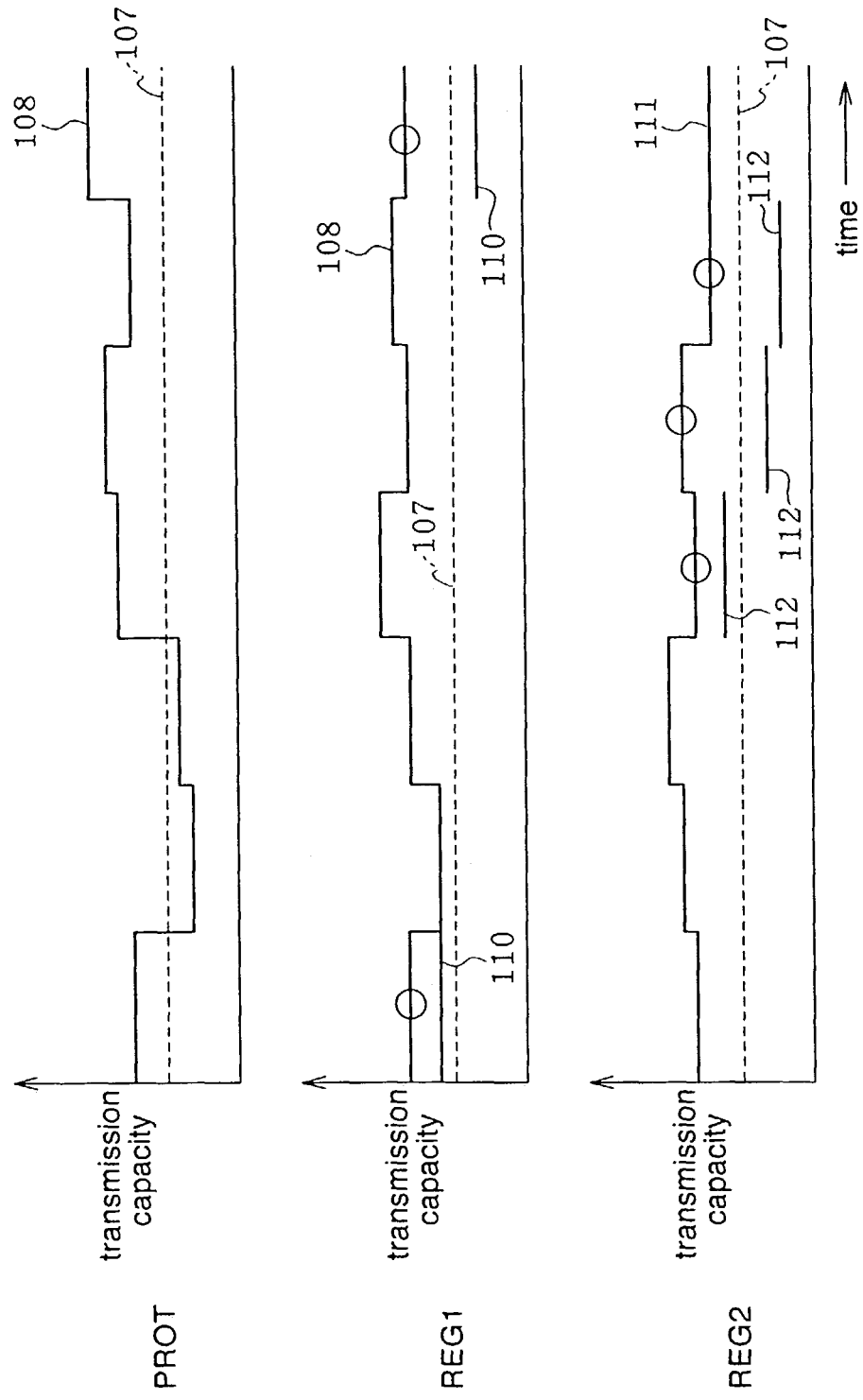
FIG. 2 is a diagram illustrating an operational example according to the first embodiment of the present invention.

FIG. 2 is a diagram illustrating an operational example according to the first embodiment of the present invention. In FIG. 2, each number shows the following transmission capacity respectively, that is, 107 is the conventional guaranteed transmission capacity, 108 is the transmission capacity of the spare line, 109 is that of the output of the first regular line (output of the reception switching device 24), 110 is that of the first regular line (signals up to the entrance of the reception switching device 24), 111 is that of the output of the second regular line (output of the reception switching device 25), and 112 is that of the second regular line (signals up to the entrance of the reception switching device 25).

Here, the transmission capacity of each line is represented as 108, 110 and 112. The transmission capacity 110 and the transmission capacity 112 are broken off in FIG. 2. At the points of which, the transmission capacity 110 and the transmission capacity 112 are in conformity with the transmission capacity 109 and the transmission capacity 111, respectively.

In FIG. 2, the parts with a circle show that the transmission capacities are remedied by the spare line. The transmission capacities after remedy exceed the conventional transmission capacity 107, and the regular lines which exceed the guaranteed transmission capacity 107 are also ensured so as to have more transmission capacity. Further, the system shown in FIG. 1 has a conventional N+1 function, which remedies a regular line with a spare line when a failure occurs in the regular line.

Although FIG. 2 shows an example of control in which the state of each line changes at a same period, there are two controlling methods. One method uses a time period as this example and the other method uses a quality change amount for controlling the state changes. In the latter case, the control depends on the state change in each line. Therefore, the point of change of each line does not appear at the same time. Besides, to make this system effective, it is necessary that the period of time from detecting a state change in each line until completing the control is sufficiently small with reference to the interval between the state changes (the period in FIG. 2).

Second Embodiment

Figure 3:
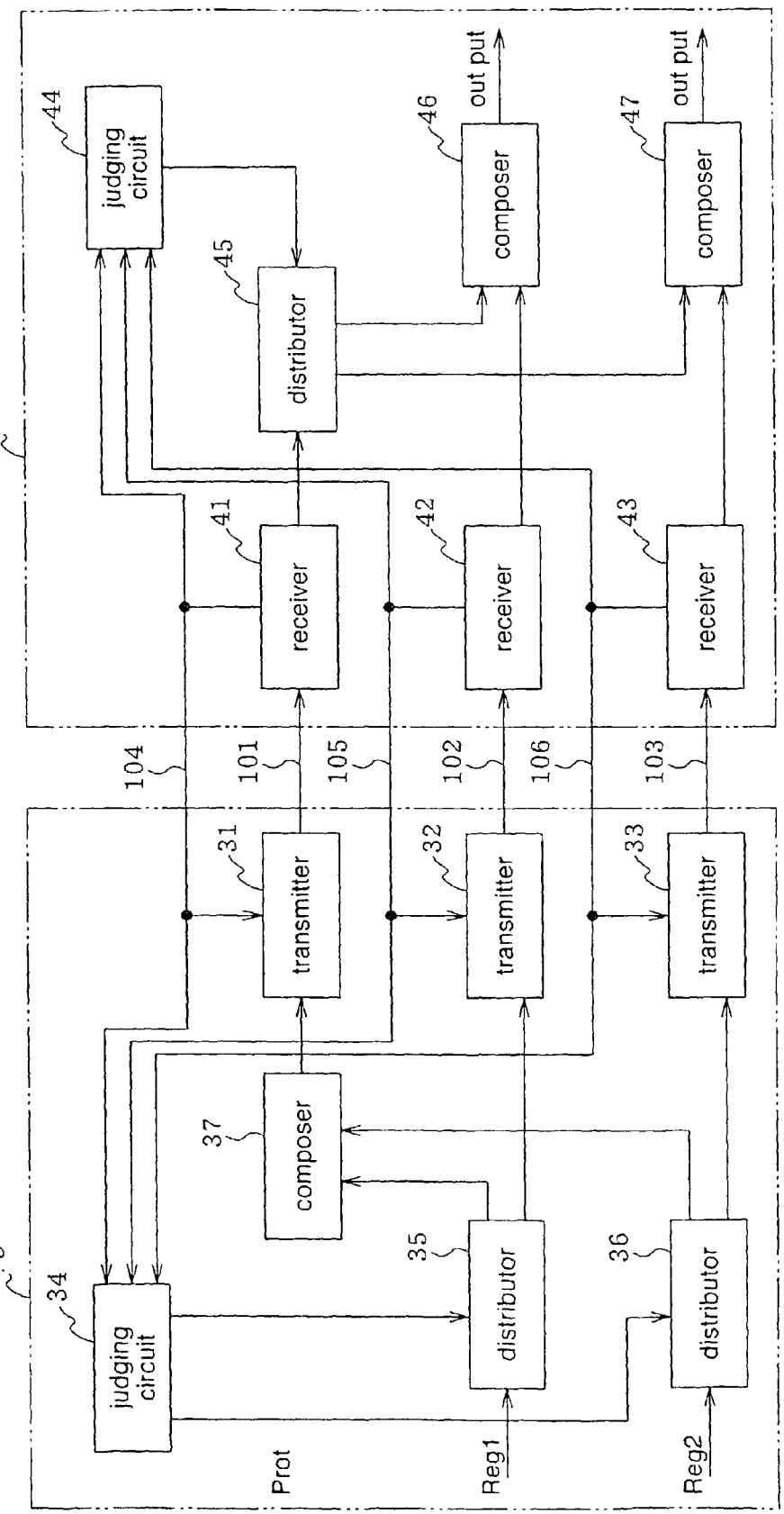
FIG. 3 is a block diagram showing the structure of a digital transmission system according to a second embodiment of the present invention.

FIG. 3 is a block diagram showing the structure of a digital transmission system according to a second embodiment of the present invention. The digital transmission system according to the second embodiment of the present invention shown in FIG. 3 has two regular lines and one spare line arranged between a station A-b 3 and a station B-b 4.

The station A-b 3 comprises transmitters 31 to 33, a judging circuit 34, distributors 35 and 36, and a combining unit 37. The station B-b 4 comprises receivers 41 to 43, a judging circuit 44, a distributor 45 and combining units 46 and 47. Between the station A-b 3 and the station B-b 4, propagation paths 101 to 103 and propagation paths 104 to 106 with sending/receiving devices (not shown) are arranged.

The receivers 41 to 43, the propagation paths 104 to 106, the judging circuit 44 and the like constitute a means for monitoring operational information of each of the regular lines and the spare line. Further, the distributors 35 and 36, the judging circuit 34 and the like constitute a means for distributing input signals on the regular lines to the spare line according to the monitored information of each line output from the monitoring means. The combining unit 37, the transmitters 31 to 33, the propagation paths 101 to 103, the distributor 45, the combining units 46 and 47 and the like constitute, by using the regular lines and the spare line together, a means for transmitting the input signals, which should be transmitted through one regular line, at a transmission capacity that is the sum of the transmission capacity of the regular lines and the transmission capacity distributed to the spare line. These components also constitute a means for outputting the transmitted signals as the output signals of the regular line.

The difference between the preferred embodiment shown in FIG. 1 and the preferred embodiment shown in FIG. 3 is a using method of the spare line, other operations being the same.

The distributors 35 and 36 distribute the input signals on a regular line to the regular line and to the spare line with a distribution ratio between 1 and 0. The combining unit 37 composites the distributed signals from the distributors 35 and 36. Then, the outputs of the combining unit 37 are the input into the transmitter 31 of the spare line.

The signals output from the transmitter 31 are received at the receiver 41 in the station B-b 4 through the propagation path 101. Then, in the station B-b 4, the distributor 45 operates to reproduce the composite signals composited at the combining unit 37 and transmitted through the propagation path 101 as described above. The combining units 46 and 47 composite the signals from the distributor 45 and the outputs from the receivers 42 and 43 arranged along the regular lines 102 and 103, and reproduce the signals from each of the regular lines 102 and 103.

The judging circuit 34 receives, as an input, signals showing the transmission capacity of each line output from the receivers 41 to 43, and produces signals determining the distribution ratio of the distributors 35 and 36 and output the signals to the distributors 35 and 36.

Figure 4:
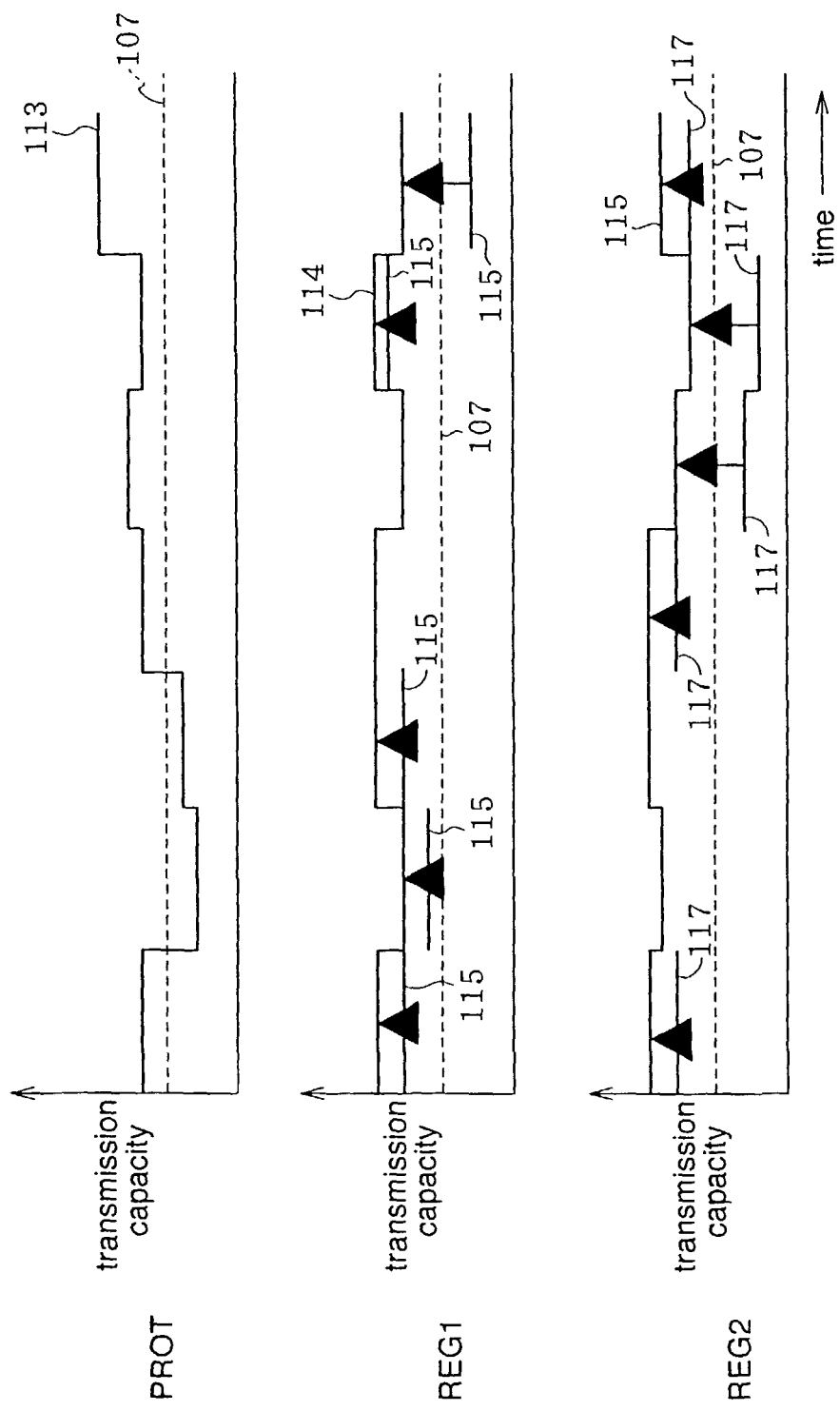
FIG. 4 is a diagram illustrating an operational example according to the second embodiment of the present invention.
Figure 5:
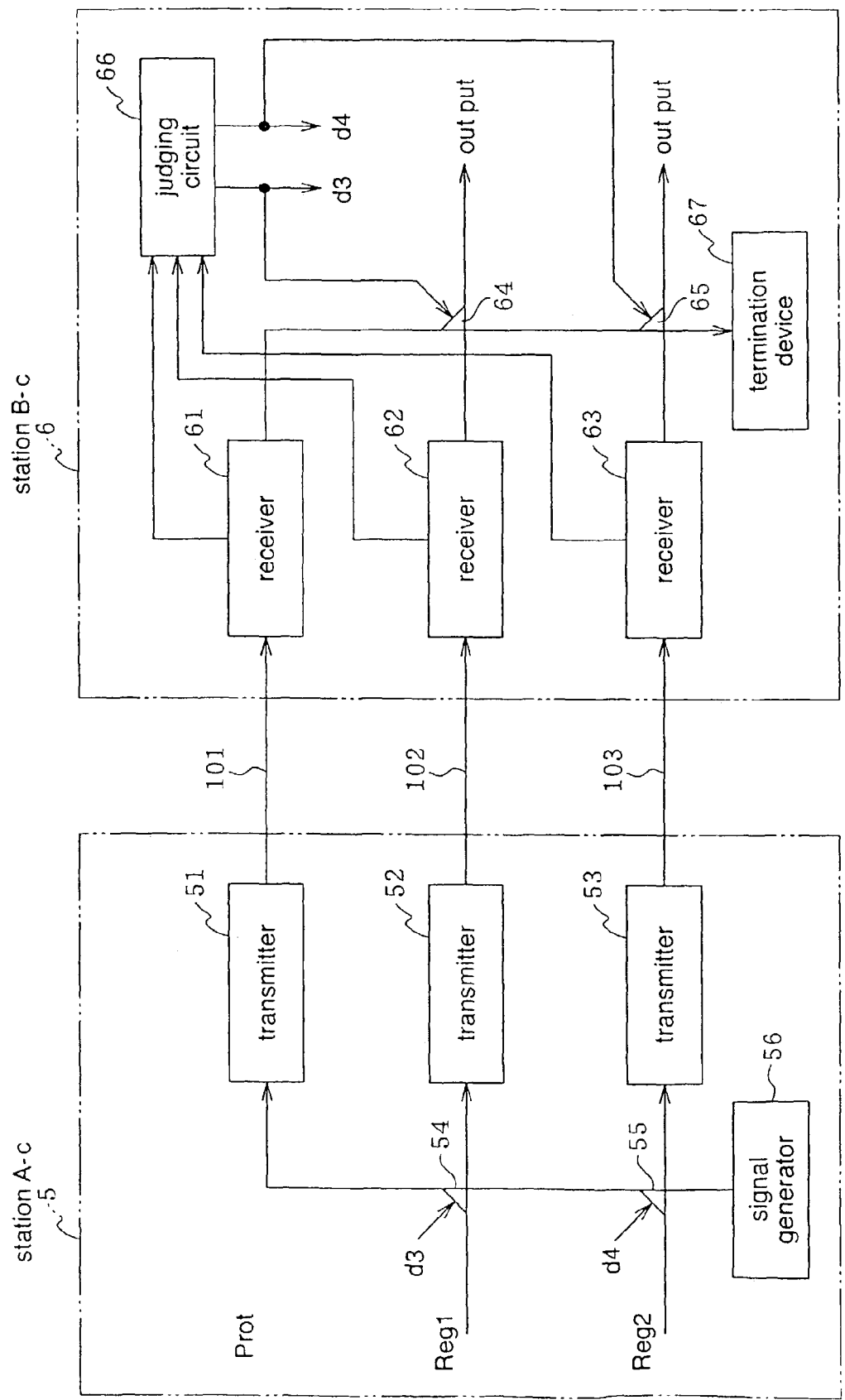
FIG. 5 is a block diagram showing the structure of a conventional digital transmission system.

FIG. 4 is a diagram illustrating an operational example according to the second embodiment of the present invention. In FIG. 4, each number shows the following transmission capacity respectively, that is, 113 is the transmission capacity of the spare line, 114 is that of the output of the first regular line (output of the combining unit 46), 115 is that of the output of the second regular line (output of the combining unit 47), 116 is that of the first regular line (signals up to the entrance of the combining unit 46), and 117 is that of the second regular line (signals up to the entrance of the combining unit 47).

Here, the transmission capacity of the spare line, the first regular line and the second regular line are represented as 113, 116 and 117 respectively. The spare line has a potential to transmit signals at the transmission capacity 113. Accordingly, the input signals on the first regular line and the second regular line are distributed to the spare line by the distributors 35 and 36, and by using the first and the second regular lines and the spare line together, the signals, which should be transmitted only via the first regular line and the second regular line, are transmitted via the first regular line, the second regular line and the spare line altogether.

Therefore, the transmission capacity of the regular lines, as shown by the arrows in FIG. 4, can substantially be increased by the distributed transmission capacity of the spare line. FIG. 4 shows just an example of a manner of distribution to the regular line, which may be decided freely beforehand.

As described above, according to the second embodiment of the present invention, it is possible to transmit signals at a transmission capacity exceeding the guaranteed transmission capacity during almost every usual time, and also, by allocating the transmission capacity of the spare line to the regular line, it is possible to add the capacity to the output of the regular line. Further, the system shown in FIG. 3 has a conventional N+1 function which remedies a regular line with a spare line when a failure occurs in the regular line.

In the present invention, in addition to the conventional N+1 function, it is possible to transmit signals at a transmission capacity exceeding the guaranteed transmission capacity during almost every usual time, and also, by allocating the transmission capacity of the spare line to the regular line, it is possible to add the capacity to the output of the regular line.

The aforementioned embodiments are described with reference to the microwave digital transmission system. However, the present invention may be applied to other radio transmission systems and wire transmission systems having a regular line and a spare line, not being limited to the microwave digital transmission system.

Further, the present invention is not limited to a method of monitoring the transmission capacity of each of the regular line and the spare line, although an example of which is described as an embodiment of the present invention. That is, in stead of the monitoring method described above, the present invention may be embodied by monitoring the whole operational information including information of the transmission capacity of the regular line and the spare line or the equivalent information.

As has been described above, the present invention has, in a system having a regular line and a spare line and using a capacity variable transmission system, effects to increase a transmission capacity and to utilize the spare line efficiently, by monitoring operational information of the regular lines and the spare line, switching input signals on the regular line onto the spare line according to the monitored information, and outputting the signals transmitted via the spare line as the output signals of the regular line.

What is claimed is:

1. A digital transmission method comprising:
controlling adaptively, by a controller, a transmission capacity of a regular line and a spare line for a microwave digital transmission system by changing adaptively Quadrature Amplitude Modulation (QAM) method of respective line based on transmission quality of radio propagation path of said respective line;
comparing, by a judging circuit, operational information including information of the controlled transmission capacity of the regular line with that of the spare line; and
switching, by a switching device, a transmission line of an input signal on the regular line to the spare line according to the comparing step.

2. The digital transmission method as claimed in claim 1, wherein the comparing the controlled transmission capacity of the regular line and the controlled transmission capacity of the spare line comprises comparing a controlled transmission capacity of a plurality of regular lines and the controlled transmission capacity of the spare line and
wherein when a line transmitting a lowest transmission capacity is one of the plurality of regular lines in the comparing step, the input signal on the one of the plurality of regular lines is transmitted by switching onto the spare line, said one of the plurality of regular lines remaining operable to transmit the other input signal while the spare line is simultaneously transmitting said input signal.

3. The digital transmission method as claimed in claim 1, wherein the switching the transmission line is performed when the controlled transmission capacity of the regular line is lower than the controlled transmission capacity of the spare line.

4. A digital transmission method comprising:
controlling adaptively, by a controller, a transmission capacity of a regular line and a spare line for a microwave digital transmission system by changing adaptively QAM method of respective line based on transmission quality of radio propagation path of said respective line;
comparing, by a judging circuit, operational information including information of the controlled transmission capacity of the regular line with that of the spare line; and
distributing, by a distributor, an input signal on the regular line to the spare line according to the comparing step.

5. A digital transmission system comprising:
- a regular line and a spare line in a microwave digital transmission system;
- a controller for controlling adaptively a transmission capacity of respective line by changing adaptively QAM method of said respective line based on transmission quality of radio propagation path of said respective line;
- a judging circuit for comparing operational information including information of the controlled transmission capacity of the regular line with that of the spare line; and
- a switching device for switching a transmission line of an input signal on the regular line to the spare line according to the judging circuit.

6. The digital transmission system as claimed in claim 5, wherein the means for comparing the controlled transmission capacity of the regular line and the controlled transmission capacity of the spare line comprises comparing a controlled transmission capacity of a plurality of regular lines and the controlled transmission capacity of the spare line and
- wherein when a line transmitting a lowest transmission capacity is one of the plurality of regular lines in the means for comparing the transmission capacity, the input signal on the one of the plurality of regular lines is transmitted by switching onto the spare line, said one of the plurality of regular lines remaining operable to transmit another input signal while the spare line is simultaneously transmitting said input signal.

7. The digital transmission system as claimed in claim 5, wherein the switching of the transmission line is performed when the controlled transmission capacity of the regular line is lower than the controlled transmission capacity of the spare line.

8. A digital transmission system comprising:
- a regular line and a spare line in a microwave digital transmission system;
- a controller for controlling adaptively a transmission capacity of respective line by changing adaptively QAM method of said respective line based on transmission quality of radio propagation path of said respective line;
- a judging circuit for comparing operational information including information of the controlled transmission capacity of the regular line with that of the spare line; and
- a distributor for distributing an input signal on the regular line to the spare line according to the judging circuit.

9. The digital transmission method as claimed in claim 1, wherein transmission of signals via the regular line is allowed to be transmitted at a capacity exceeding a guaranteed transmission capacity.

10. The digital transmission method as claimed in claim 9, wherein said transmission at exceeding capacity is achieved by allocating transmission capacity of the spare line to the regular line.

11. The digital transmission method as claimed in claim 1, wherein said transmission capacity is adaptively controlled by changing modulation technique.

12. The digital transmission method as claimed in claim 1, wherein said transmission capacity is adaptively controlled by changing the variable transmission system clock frequency.

13. The digital transmission method as claimed in claim 1, wherein said transmission capacity is adaptively controlled according to an operational state of the whole system, including propagation paths and other components.

14. The digital transmission method as claimed in claim 1, wherein said spare line is monitored by sending pseudo signals onto said spare line.

15. The digital transmission method as claimed in claim 4, wherein transmission of signals via the regular line is allowed to be transmitted at a capacity exceeding a guaranteed transmission capacity.

16. The digital transmission method as claimed in claim 15, wherein said transmission at exceeding capacity is achieved by allocating transmission capacity of the spare line to the regular line.

17. The digital transmission method as claimed in claim 4, wherein said transmission capacity is adaptively controlled by changing modulation technique.

18. The digital transmission method as claimed in claim 4, wherein said transmission capacity is adaptively controlled by changing the variable transmission system clock frequency.

19. The digital transmission method as claimed in claim 4, wherein said transmission capacity is adaptively controlled according to an operational state of the whole system, including propagation paths and other components.

20. The digital transmission method as claimed in claim 4, wherein said spare line is monitored by sending pseudo signals onto said spare line.

21. A digital transmission system comprising:
- a regular line and a spare line in a microwave digital transmission system;
- a controller for controlling adaptively a transmission capacity of respective line by changing adaptively QAM method of said respective line based on transmission quality of radio propagation path of said respective line;
- a judging circuit for comparing operational information including information of the controlled transmission capacity of the regular line with that of the spare line; and
- a switching device for switching a transmission line of an input signal on the regular line to the spare line according to the judging circuit.

22. The digital transmission system as claimed in claim 21, wherein said transmission capacity is adaptively controlled according to an operational state of the whole system, including the regular line, spare line, and other components.

23. The digital transmission system as claimed in claim 21, wherein a generator monitors the spare line by sending pseudo signals onto said spare line.

24. A digital transmission system comprising:
- a regular line and a spare line in a microwave digital transmission system;
- a controller for controlling adaptively a transmission capacity of respective line by changing adaptively QAM method of said respective line based on transmission quality of radio propagation path of said respective line;
- a judging circuit for comparing operational information including information of the controlled transmission capacity of the regular line with that of the spare line; and
- a distributor for distributing an input signal on the regular line to the spare line according to the judging circuit.

25. The digital transmission system as claimed in claim 24, wherein said transmission capacity is adaptively controlled according to an operational state of the whole system, including the regular line, spare line, and other components.

26. The digital transmission system as claimed in claim 24, wherein a generator monitors the spare line by sending pseudo signals onto said spare line.

27. A digital transmission apparatus comprising:
transceivers for transmitting and receiving signals for a regular line and a spare line in a microwave digital transmission system;
a controller for controlling adaptively a transmission capacity of respective line by changing adaptively QAM method of said respective line based on transmission quality of radio propagation path of said respective line;
a judging circuit for comparing operational information including information of the controlled transmission capacity of the regular line with that of the spare line; and
a switching device for switching a transmission line of an input signal on the regular line to the spare line according to the judging circuit.

* * * * *